UNITED STATES PATENT OFFICE.

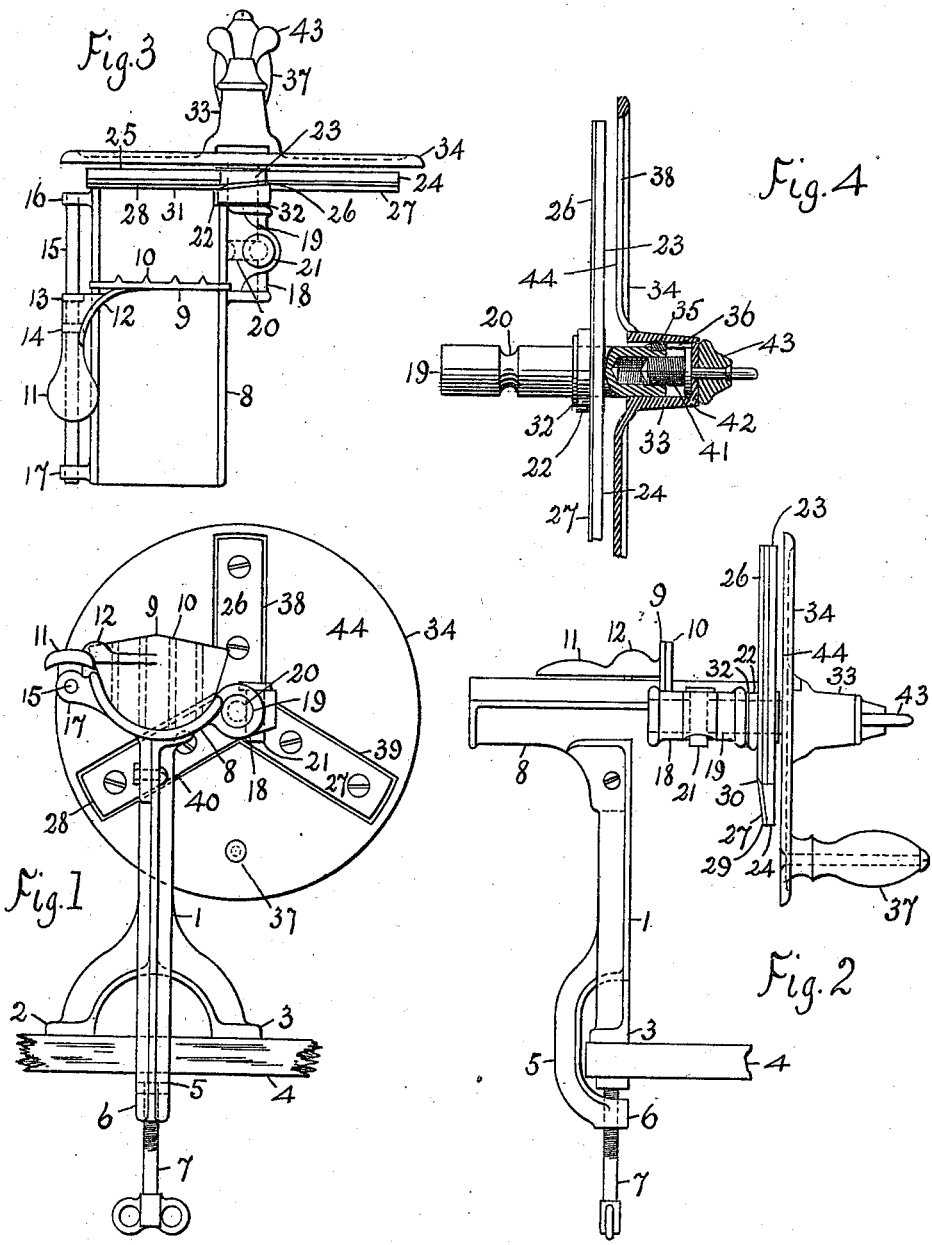

HARRY SCHOENMEIER AND LOUIS MAU, OF PHILADELPHIA, PENNSYLVANIA.

SLICING-MACHINE.

964,123. Specification of Letters Patent. Patented July 12, 1910.

Application filed December 13, 1909. Serial No. 532,823.

*To all whom it may concern:*

Be it known that we, HARRY SCHOENMEIER and LOUIS MAU, citizens of the United States, residing at Philadelphia, in the county of Philadelphia and State of Pennsylvania, have invented certain new and useful Improvements in Slicing-Machines, of which the following is a specification.

This invention has for its object the construction of a machine for the slicing of vegetables and fruits in the preparation of foods and condiments. Its construction, with multiple knives, rotatably mounted, to give a drawing cut, insures great rapidity of production, and the means employed to graduate the slicing to any desired or necessary degree of thickness make it thoroughly adapted to the preparation of all kinds of fruits or vegetables preferably prepared by slicing.

The invention is illustrated in the accompanying drawings wherein similar parts are designated by similar reference characters, in which—

Figure 1 is a rear end elevation. Fig. 2 is a side elevation. Fig. 3 is a top view. Fig. 4 is a view, on a larger scale, partly in section, of the graduating means for varying the thickness of the slices.

A stand, to secure the machine, is formed with an upright member 1, having feet 2, 3 adapted to rest on a table or bench 4, and a side projection 5 passing around and under the edge of table 4 and terminating in a hub 6 screw threaded to receive a clamping screw 7.

Mounted on the stand there is a trough shaped receptacle 8, for holding the material to be sliced. Within receptacle 8 there is a feeder or follower comprising a plate 9 with spurs 10 at its front, a handle 11, a projection 12 for thumb pressure, and lugs 13, 14 which pivotally attach the feeder or follower to a rod 15 secured in lugs 16, 17 integral with receptacle 8. This construction allows the feeder or follower to be swung outward from the receptacle, to enable the thorough sanitary condition of the receptacle and feeder or follower to be maintained.

At the front side of receptacle 8, opposite handle 11, there is a hub 18 in which is journaled a shaft 19 having a semicircular groove 20 into which a pin 21 is passed to secure the retention of the shaft in the hub, while permitting its rotation, and at the same time insuring the quick removal of the shaft. Mounted on shaft 19 there is a hub 22 carrying radial arms 23, 24, 25 on which are secured the cutting knives 26, 27, 28 the knives being secured on an angle, as best seen in Fig. 2, so as to give a clearance to their back edges 29, and allow their cutting edges to pass closely to the forward end 31 of receptacle 8. A washer 32 is placed between hubs 18 and 22. Shaft 19 extends outward from hub 22 and thereon is mounted a hub 33 of the graduating plate 34, the shaft 19 having a spline 35 fitting in a slot 36 of hub 33 so that the shaft 19, arms 23, 24, 25, cutters 26, 27, 28 and plate 34 are all rotated in unison by handle 37 secured in plate 34. Graduating plate 34 is provided with openings or slots 38, 39, 40 opposite arms 23, 24, 25 and their attached cutters, to enable the cutters to become flush with the inner face of the plate, and as an outward passage for the slicings. The outer end of shaft 19 is tapped to receive a screw 41 secured from end movement by a collar 42 within hub 33 and a thumb nut 43 exterior to the hub. By manipulating thumb nut 43 the graduating plate 34 may be made to have its inner face 44 come flush with the end 31 of receptacle 8 and the cutting edges 30 of cutters 25, 26, 27 or to recede therefrom to any desired degree, thus regulating the thickness of the slices to be cut.

We claim.

In a slicing machine, in combination, a stand and a receptacle thereon; a pivotally guided follower with a handle therefor; a bearing opposite the handle having a vertical pin at one side of the bearing; a shaft in the bearing having a semicircular groove adapted to receive the pin, retain the shaft, and permit its easy and quick removal; a series of radial arms in fixed position on the shaft, cutters thereon to permanently rotate adjacent the end of the receptacle; a graduating plate exterior to the radial arms and having a hub around the shaft aforesaid, a spline therein, a slot in the shaft for the spline to cause the graduating plate to rotate with the arms; a screw entering the shaft, with means for its operation to move the graduating plate toward and away from the cutters, the graduating plate being provided with openings or slots into which the radial arms and their cutters may recede.

In testimony whereof we affix our signatures in presence of two witnesses.

HARRY SCHOENMEIER.
LOUIS MAU.

Witnesses:
CHARLES E. WILLIAMS,
R. C. WRIGHT.